United States Patent [19]

Rich et al.

[11] 4,366,254

[45] Dec. 28, 1982

[54] HIGH TOUGHNESS CERAMIC CUTTING TOOL

[75] Inventors: Dennis J. Rich, Troy; Frederick C. Holtz, Jr., Birmingham, both of Mich.

[73] Assignee: The Valeron Corporation, Troy, Mich.

[21] Appl. No.: 259,560

[22] Filed: May 1, 1981

Related U.S. Application Data

[63] Continuation-in-part of Ser. No. 141,102, Apr. 17, 1980, abandoned.

[51] Int. Cl.$^3$ ............... C04B 35/44; C04B 35/48; C04B 35/56; C04B 35/58
[52] U.S. Cl. ............................. 501/89; 51/309; 501/89; 501/96; 501/105
[58] Field of Search ............ 106/43, 57; 51/309; 501/87, 89, 105, 92, 96

[56] References Cited

U.S. PATENT DOCUMENTS

| | | | |
|---|---|---|---|
| 2,849,305 | 8/1958 | Frost | 106/43 |
| 3,181,939 | 5/1965 | Marshall et al. | 51/309 |
| 3,776,744 | 12/1973 | Clendeneri | 106/73.4 |
| 3,886,254 | 5/1975 | Tanaka et al. | 51/309 |
| 4,087,894 | 5/1978 | Kuechli et al. | 106/43 |
| 4,204,873 | 5/1980 | Yamomoto et al. | 106/43 |
| 4,205,964 | 6/1980 | Hill | 501/105 |
| 4,218,253 | 8/1980 | Dworck et al. | 106/43 |
| 4,298,385 | 11/1981 | Claussen et al. | 501/105 |

OTHER PUBLICATIONS

Rosenfield, A. R., "Progress Toward Tough, Creep-Resistant Ceramics", Battelle Columbus Laboratories, Columbus, Ohio, Current Awareness Bulletin, 11/27/81, Issue No. 105.

*Primary Examiner*—Mark Bell
*Attorney, Agent, or Firm*—Robert S. Alexander

[57] ABSTRACT

High-toughness, high-wear resistance cutting tool based on alumina are formed by additions of zirconia and optionally refractory metal carbides or nitrides.

23 Claims, No Drawings

HIGH TOUGHNESS CERAMIC CUTTING TOOL

This application is a continuation in part of Ser. No. 06/141,102, filed Apr. 17, 1980, now abandoned.

BACKGROUND OF THE INVENTION

Ceramic compositions are receiving widespread acceptance for use as cutting tools and cutting tool inserts because of their excellent wear properties. Unfortunately, many of the ceramic materials heretofore known to the prior art are quite brittle and their use has been primarily confined to light duty work such as finish machining. Application of such prior art ceramic materials to heavy duty cutting operations has been restricted due to the lack of toughness of such materials resulting in tool fracture under such severe operating conditions.

In order to overcome such prior art problems, various compounds have been incorporated in an alumina ceramic to achieve increased toughness while retaining acceptable wear resistance. These additives are detailed in the following references:

Nils Claussen, et al., CERAMIC BULLETIN, Vol. 56, No. 6 (1977), *Effect of Induced Microcracking on the Fracture Toughness of Ceramics.*

D. Greve, et al., CERAMIC BULLETIN, Vol. 56, No. 5 (1977), *Thermal Diffusivity/Conductivity of Alumina with a Zirconia Dispersed Phase.*

Nils Claussen, JOURNAL OF THE AMERICAN CERAMIC SOCIETY, Vol. 59, No. 1-2, Jan.-Feb. 1976, *Fracture Toughness of $Al_2O_3$ with an Unstabilized $ZrO_2$ Dispersed Phase.*

*Roll Turning and Resurfacing with Oxide-Carbide Ceramics,* by F. C. Holtz and F. L. Frobert, The Valeron Corporation, presented at New Developments in Tool Materials and Application Symposium on March 21-22, 1977, Chicago.

U. Dworak et al., Ber. DT. Keram. Ges. 55 (1978) Nr. 2; *Mechanical Strengthening of Multiphase Ceramics as Illustrated by the $ZrO_2$ —$ZrO_2/Al_2O_3$ —$ZrO_2/Al_2O_3$—TiC Systems.*

UNITED STATES PATENTS

U.S. Pat. No. 2,849,305, Frost, Aug. 26, 1958
U.S. Pat. No. 3,313,605, Gill, Apr. 11, 1967
U.S. Pat. No. 3,369,877, Humenik et al. Feb. 20, 1968
U.S. Pat. No. 3,409,416, Yates, Nov. 5, 1968
U.S. Pat. No. 3,409,419, Yates, Nov. 5, 1968
U.S. Pat. No. 3,454,385, Amero, July 8, 1969
U.S. Pat. No. 3,502,447, Daniels, Mar. 24, 1970
U.S. Pat. No. 3,507,631, Yates, Apr. 21, 1970
U.S. Pat. No. 3,542,529, Bergna et al. Nov. 24, 1970
U.S. Pat. No. 3,580,708, Ogawa et al. May 25, 1971
U.S. Pat. No. 3,652,304, Daniels, Mar. 28, 1972
U.S. Pat. No. 3,705,025, Daniels, Dec. 1972
U.S. Pat. No. 3,926,567, Fletcher (Phillips), Dec. 16, 1975
U.S. Pat. No. 3,953,177, Sedlatschek et al. Apr. 27, 1976
U.S. Pat. No. 4,022,584, Rudy, May 10, 1977
U.S. Pat. No. 4,063,908, Ogawa et al. Dec. 20, 1977
U.S. Pat. No. 4,157,898, Walker et al. June 12, 1979
U.S. Pat. No. 4,194,887, Ueltz et al. Mar. 25, 1980
British Pat. No. 955,887, Norton Company, Apr. 22, 1964

Notable among such additive compounds is titanium carbide which has provided for a marked increase in toughness accompanied by a decrease in wear resistance when machining most metals in comparison to substantially pure alumina. In spite of the reduction of wear resistance, cutting tools and cutting inserts comprising a controlled mixture of alumina and titanium carbide have received widespread commerical acceptance because of the improved toughness over that of substantially pure alumina.

However, these titanium carbide containing inserts are usually prepared by hot pressing which is a relatively expensive process as compared to cold pressing and sintering which can be used to prepare inserts of substantially pure alumina. Thus, there has been a need for cutting tools having toughness comparable or superior to alumina-titanium carbide tools which could be formed by cold pressing and sintering.

Further, many machinists preferred to use substantially pure alumina for some metals and alumina-titanium carbide for others which necessitated stocking inserts in the two types. Therefore, it can be seen that there has also been a need for inserts whose properties enabled their use on metals having a wide range of hardness so that only one type of insert need be stocked.

The ceramic cutting tools of the present invention can be formed by either cold pressing and sintering or hot pressing while a still further improvement in operating characteristics is attained, achieving an unusual combination of toughness and excellent wear resistance under medium duty finishing operations of most metals, together with surprisingly high wear and chip resistance when used in heavy cuts in turning of high hardness steels.

SUMMARY OF THE INVENTION

The benefits and advantages of the present invention are based on the discovery that by combining controlled amounts of alumina, zirconia and optionally, a refractory metal compound, a ceramic cutting tool material is provided which has substantial toughness without a significant sacrifice in the wear resistance in comparison to substantially pure alumina. More specifically, the present invention is directed to cutting tools of novel ceramic composition containing, on a volume percent basis, about 4% to about 20% zirconia, about 60% to about 90% alumina, and optionally up to about 30% of a refractory metal compound selected from the group consisting of the carbides, nitrides, and carbonitrides of the Group IVB and VB metals of the periodic table, and the carbides of the Group VIB metals of the periodic table as well as mixtures of any of the foregoing refractory metal compounds. The composition of the present invention is further characterized as containing less than 1% total of the iron group metals (iron, nickel, and cobalt) and mixtures thereof.

The ceramic composition comprises a substantially dense, homogeneous sintered body which may be produced by hot pressing a uniformly blended mixture of the individual constituents having an average particle size of less than about 10 microns under high pressure at controlled elevated temperatures in accordance with conventional hot pressing techniques for a period of time to produce a coherent integral body. Alternatively, cutting tools of the present invention may be formed by cold pressing and sintering in accordance with conventional techniques. The compositions provide excellent wear resistance with commercially acceptable toughness. The wear resistance of the compositions of the present invention is surprisingly high whether used in machining steels with relatively high hardness or softer annealed steels. Thus, the compositions of the present invention provide excellent wear resistance on most metals commonly encountered, including the extremely important medium hardness steels, while the prior art compositions tend to exhibit high wear resistance over rather limited ranges of hardness and markedly decreased wear resistance in other ranges.

The improved ceramic cutting tool material of the present invention possessed of high toughness and excellent wear resistance contains, as its essential constituents, controlled amounts of alumina, zirconia, and optionally a refractory metal compound chosen from the group consisting of the carbides, nitrides and carbonitrides of a reactive refractory metal chosen from Group IVB and VB of the periodic table and the carbides of a refractory metal chosen from Group VIB of the periodic table as well as mixtures of the foregoing refractory metal compounds.

More specifically, the ceramic composition contains, on a volume percent basis, about 4% to about 20% zirconia, preferably from about 5 to about 14% zirconia and most preferably from about 8 to 12% zirconia. The optional refractory metal compound is selected from the group consisting of the carbides, nitrides and carbonitrides of the Group IVB metals (namely; titanium, zirconium and hafnium) or the Group VB metals (namely; vanadium, niobium and tantalum) and the carbides of the Group VIB metals (namely; chromium, molybdenum and tungsten). The refractory metal constituent can be present in the form of any of the compounds above or mixtures of the foregoing. The amount of refractory metal compounds present can vary widely. Compositions containing from as little as 3 volume percent to as much as 30% have desirable properties. In preferred compositions, the amount of refractory metal compound present will vary from between about 4 to about 20%, with amounts between about 5 to about 15% being more preferred. In the most preferred compositions, the amount of refractory metal compound present will be between about 6 and about 10% by volume.

If a substantial amount of the optional refractory metal compound is not included, it is preferred that the cutting tool contain from about 8% to about 12% zirconia. The balance of the ceramic cutting material consists essentially of alumina along with minor impurities present in conventional amounts which are usually introduced either as impurities in the raw materials or during the grinding and/or blending of the powders into a substantially uniform mixture prior to pressing. It is important to the present invention that the ceramic cutting tool does not have an iron group metal matrix serving as a binder for the essential constituents even though particles of iron group metals can be dispersed throughout the material without seriously impairing the properties. In fact, the minor amounts of iron group metal and refractory carbide (from about 0.01% to about 0.5% iron group metal and from about 1% up to about 3% refractory metal carbide) remaining after milling with cemented carbide balls seem to have the beneficial result of lessening grain growth during sintering. It is preferred, however, that the ceramic material does not contain more than about 1% by volume of matrix forming metals selected from the group consisting of iron, cobalt and nickel as well as alloys and mixtures thereof since the presence of the large amounts of such metals tends to facilitate the formation of a matrix in the ceramics.

In accordance with a more preferred practice of the present invention, the ceramic material includes less than 0.5% of such iron group metals with amounts less than about 0.25% being especially preferred. It is to be emphasized that any iron group metals present do not serve as a binder of the essential constituents of the ceramic composition.

Larger amounts of refractory metals may be included without significantly degrading the performance of the cutting tool. Tungsten, molybdenum and titanium may be present in the binary alumina-zirconia cutting tools in amounts of up to about 10% without seriously harming its cutting abilities. It is preferred that any metal present in excess of 2% be in the form of discrete particles.

Of the several refractory metal compounds that can satisfactorily be employed in the composition, titanium carbide (TiC), titanium nitride (TiN), tungsten carbide (WC), ditungsten carbide ($W_2C$) and a mixture of 60% hafnium carbide (HfC) and 40% niobium carbide (NbC) comprise the preferred materials. An especially satisfactory hot pressed composition consists essentially of about 83% alumina, about 9% zirconia and about 8% titanium carbide, tungsten carbide or titanium nitride. An especially preferred cold pressed and sintered composition consists essentially of about 10% zirconia and 90% alumina.

The preparation of the ceramic composition of the present invention is achieved by providing the several constituents in the form of a fine-sized powders of an average particle size usually less than about 10 microns, and preferably of an average size less than about 5 microns. The manners by which the powders can be comminuted to the requisite particle size are well known and can be achieved in accordance with prior art techniques. Typical of such techniques are those disclosed in U.S. Pat. No. 3,542,529, the substance of which is incorporated herein by reference. In view of the stability of the ingredients, the extraordinary measures used in the above-mentioned patent to preserve purity after milling are not needed with the compositions of the present invention. As mentioned, it appears to be beneficial to use cemented carbide inserts in milling.

Carefully measured amounts of the powder constituents within the permissible ranges are suitably blended to form a substantially uniform mixture whereafter a blank is formed by either cold pressing and sintering or by hot pressing the mixture in graphite dies under high pressure in a protective atmosphere in accordance with known prior art practices. Typically, in hot pressing, pressures ranging from about 1,000 to about 6,000 psi can be employed at temperatures of from about 1500° C. up to about 1700° C. with temperatures of about 1550° C. to about 1650° C. being preferred. The hot pressing process is performed in accordance with techniques as described in the aforementioned United States patents under a nitrogen atmosphere for a period of time sufficient to form a substantially fully dense integrally sintered mass. Conventionally, the duration of the hot pressing process will vary depending upon the specific constituents employed, the properties used, the temperature of the pressing operation, the average particle size of the powders employed and the size of the blank being formed.

It will be noted that in addition to the high toughness and excellent wear resistance of the ceramic cutting material produced in accordance with the present invention, the composition provides a further unexpected advantage of increased tool life of the graphite mold and dies conventionally employed in such hot pressing operations. In comparing the results of pressings in the same hot pressing apparatus, it was found that the optimum temperature for the preferred compositions of the present invention was lower than the optimum temperature for prior art alumina titanium carbide compositions. As measured, the preferred temperature for forming a composition of the present invention having optimum properties was between about 1550° C. and 1650° C. while it was found desirable to maintain the temperature used for consolidating the prior art alumina-titanium carbide compositions as close to 1675° C. as practicable. Higher temperatures were avoided to minimize the risk of materially shortening the life of the graphite dies because of the possibility of incurring undesirable sticking of the composition to the graphite surfaces, even though higher temperatures appear desirable to form an optimum product.

If the blank is consolidated by cold pressing, and sintering, a small amount of paraffin is usually included in the powdered composition prior to pressing. The amount included is usually between about 4 and about 8% by weight. After cold pressing, the blank is vacuum sintered in accordance with well known prior art sintering techniques. Inserts consisting essentially of alumina and zirconia having desirable properties are preferably consolidated by cold pressing and sintering at temperatures of between about 1650° and about 1750° C. Inserts comprising alumina, zirconia and a refractory metal compound may be consolidated by hot pressing or by cold pressing and sintering. While it is easier to form a satisfactory insert by hot pressing, cold pressing and sintering is extremely attractive from an economic point of view and may be employed to form both types of inserts. Generally it is easier to sinter those compositions which contain lesser amounts of the optional refractory metal compounds. Sintering can be facilitated by incorporation of minor amounts of well known sintering aids.

Typically, the blanks are pressed into a shape roughly equivalent to the desired shape and after final consolidation are ground to finished configuration. After finish grinding, the consolidated ceramic inserts produced are readily adaptable for a variety of cutting tool and cutting tool insert applications including turning, facing, boring, milling, and the like. The ceramic cutting tool blanks can readily be fabricated in a variety of geometries in accordance with known cutting tool configurations to provide for optimum cutting efficiency in accordance with its intended end use.

Cutting tools composed of the ceramic composition of the present invention possess high toughness, excellent wear resistance and unusual resistance to chipping and cracking which properties are comparable, in many instances, and superior in some instances, to those of substantially pure alumina in metal cutting operations. Further, the wear resistance of the materials of the present invention is unsurpassed by the wear resistance of both the prior art alumina and alumina titanium carbide materials in machining of steels in the important medium range of hardness (i.e. around 300 BHN.)

In order to further demonstrate the superiority of cutting tools and inserts composed of the ceramic material of the present invention a series of machining tests including tool wear tests were conducted in comparison to prior art ceramic cutting tool materials including substantially pure alumina as well as commercial mixtures of alumina and titanium carbide. Throughout this application, the ceramic materials tested were in the form of a cutting tool insert having a standard SNG 434 shape with 0.006 inch by 30° chamfers. Where compositions of the present invention are formed into inserts by hot pressing, unless stated to the contrary, it is to be understood that these were hot pressed at 1650° C. and examined metallographically to verify that the inserts were substantially fully dense without deleterious porosity. Where inserts are formed by cold pressing, unless stated to the contrary, it is to be understood that approximately 6% wax (by weight) was added to the powdered mix and that the inserts were sintered at approximately 1700° to 1750°.

One test used comprises a facing test in which a bar of pre-machined hot rolled AISI type 4150 steel is faced at constant rpm from 7 inches initial diameter down to a final diameter of 2.75 inches. The depth of cut of 0.060 inch is effected at a feed rate of 0.014 inch per revolution. The materials of the present invention will survive from 50 to 60 cuts without chipping, fracturing or developing excessive wear. This performance is substantially equivalent to the results obtained with the best of the presently commercially available ceramics and significantly superior to most commercially available ceramic cutting tools.

In order to further illustrate the ceramic cutting tool material of the present invention and the improved cutting characteristics thereof, the following examples are provided. It will be understood that the examples are provided for illustrative purposes and are not intended to be limiting of the composition as herein disclosed and as set forth in the subjoined claims.

EXAMPLE 1

For comparative purposes, a large number of commercially available SNG 434 shape ceramic cutting inserts reportedly consisting essentially of 25.7 volume percent titanium carbide and 74.3 volume percent alumina, hereinafter designated as Composition A, were subjected to the above described facing test. Similarly, a large number of commercially available SNG 434 shape ceramic cutting inserts reportedly consisting essentially of a cold pressed and sintered mixtures of alumina and up to about 2% zirconia, (hereinafter designated as Composition B) were also subjected to this facing test. The results are summarized in Table I wherein the inserts of the several compositions tests are rated on a scale of from 1 to 4. A rating of 4 indicates that the performance of these inserts was judged to be substantially equivalent to the best commercially available products known. A rating of 3 indicates that the performance was within commerically accepted limits but was noticeably inferior to the performance of the compositions judged to be best by this test. A rating of 2 indicates that the performance was considered marginally acceptable while a rating of 1 indicated poor performance.

EXAMPLE 2

A series of test specimens in the form of cutting tool inserts of a composition in accordance with the practice of the present invention are prepared and are designated as Compositions C through K. The composition of the individual test specimens are as set forth in Table I.

Each of test Compositions C-K is prepared by uniformly blending carefully measured quantities of the several constituents in a titanium lined ball mill containing sintered tungsten carbide balls for a period of about nine hours in acetone. The average particle size of the resultant powder mixture is less than about 5 microns. The blended powder mixture is thereafter carefully measured into graphite dies and is hot pressed at a temperature of 1650° C. under a pressure of about 4000 psi for a period of about 6 to about 30 minutes under a controlled atmosphere of nitrogen. The resultant test compositions are ground into cutting inserts of a standard SNG 434 configuration. These inserts were subjected to the facing test under the same conditions

TABLE I

| Composition | Composition of Inserts Ingredient, Volume Percent* | | | | Rating On Facing Test |
|---|---|---|---|---|---|
| | $ZrO_2$ | TiN | 60:40 HfC:NbC | TiC | |
| A | — | — | — | 25.7 | 2-4 |
| B | —2 | — | — | — | 2-4 |
| C | 15.3 | — | — | 15.0 | 4 |
| D | 9.2 | — | — | 8.0 | 4 |
| E | 8.3 | — | — | 17.2 | 4 |
| F | 9.2 | — | 8.0 | — | 4 |
| G | 9.0 | 8.0 | — | — | 4 |
| H | 15.0 | — | — | 7.5 | 4 |
| J | 4.6 | — | — | 8.0 | 3 |
| K | 10.0 | — | — | 4.0 | 4 |

*Balance, $Al_2O_3$

Most of the inserts of Composition A were rated within a range of between 2 and 3 and only inserts coming from one particular manufacturer were fairly consistently rated at 4. Similarly, of the inserts having composition B, only those coming from one particular manufacturer were fairly consistently rated at 4, while the remainder varied between 2 and 4. Of the inserts of the compositions C-K, corresponding to the present invention, the performance of these were judged to be substantially equal to the best of the presently available compositions and decidedly superior to the majority of the presently available commercial compositions.

EXAMPLE 3

A further series of test specimens in the form of cutting inserts of compositions L-P of the present invention are prepared and tested as in Example 2. The compositions and the results obtained on the facing test are summarized in Table II wherein the ratings have the same meaning as in Table I.

TABLE II

| Composition | Composition of Inserts Ingredient, Volume Percent* | | | Rating on Facing Test |
|---|---|---|---|---|
| | $ZrO_2$ | WC | $W_2C$ | |
| L | 8.3 | 17.2 | — | 4 |
| M | 9.2 | 8 | — | 4 |
| N | 15.3 | 15 | — | 4 |
| P | 8.3 | — | 17.2 | 4 |

*Balance $Al_2O_3$

The performance of the inserts of compositions L-P was judged to be excellent for this type of cut which is substantially equal to the best of the presently available compositions and decidedly superior to the majority of the presently available commerical compositions.

EXAMPLE 4

A still further series of inserts of compositions Q-T of the present invention were prepared in accordance with the above described facing test. Inserts of Composition Q were also prepared by cold pressing and sintering. The performance of these cold-pressed inserts was substantially equivalent to that of the hot pressed inserts. The compositions and results obtained on the facing test are summarized in Table III.

TABLE III

| Composition | Composition of Inserts $ZrO_2$, Volume Percent* | Rating on Facing Test |
|---|---|---|
| Q | 10 | 4 |
| R | 18 | 3-4 |
| S | 5 | 4 |
| T | 15 | 4 |

*Balance $Al_2O_3$

EXAMPLE 5

A further series of tests were conducted to demonstrate the excellent wear resistance of cutting inserts produced in accordance with the practice of the present invention relative to prior art ceramic materials. For this purpose, hot pressed test inserts having compositions D, E, K, and Q, as previously set forth in Tables I and III, were formed. For comparison purposes, a commerically available alumina-titanium carbide cutting insert corresponding to composition A and a commercially available alumina cutting insert corresponding to Composition B, as previously set forth, were evaluated under identical test conditions.

For evaluating the relative wear resistance of the several test inserts, a round bar composed of a hot rolled annealed AISI type 4150 steel was turned along the length thereof at a cutting rate of 950 sfm. The depth of cut was 0.050 inch with 0.0125 inch per revolution of feed and a 15° lead angle. The use of the test inserts during the cutting of each bar was alternated throughout the tests so that each was used at approximately the same average diameter over the duration of the test. The flank wear was measured after ten minutes and the data are summarized in Table IV.

TABLE IV

| Annealed Steel Turning Test Results | |
|---|---|
| Composition | Flank Wear, inches |
| A | = 0.0155 |
| B | = 0.0128 |
| D | = 0.0128 |
| E | = 0.0155 |
| K | = 0.0128 |
| Q | = 0.0128 |

It is apparent from the foregoing data that the inserts of compositions A and E exhibit significantly higher rates of wear on annealed steel than the remaining test inserts evaluated. The commercially available substantially pure alumina cutting inserts of composition B have heretofore been recognized for their exceptional wear resistance on annealed steels. Inserts of composition B have exhibited similar wear resistance under this type of cutting test procedure on annealed steels regardless of source of manufacture. Similarly, test inserts of composition A regardless of manufacturer, have performed substantially the same under this type of test. In comparison, within the experimental error of the test procedure, the inserts of composition D, K and Q of the present invention exhibit higher wear resistance than any of the inserts of composition A and substantially equivalent to the best of those of composition B.

EXAMPLE 6

To evaluate the ability of the various ceramics to withstand relatively severe cuts on quenched and tempered steel, the test procedure of Example 3 was repeated using type A6 steel having a Rockwell "C" hardness of 60, using a cutting speed of 225 sfm with a 0.030 inch depth of cut at a feed of 0.005 inch per revolution. Inserts of composition A, B and D were tested but only the inserts of composition D were capable of withstanding this relatively severe cut without chipping. After 5.8 minutes, typical flank wear of inserts of composition D was measured and found to be only 0.0024 inch. This demonstrates that cutting inserts of composition D are excellent for this type of cut. In a repeat of this experiment, using a bar of type A6 steel having a Rockwell "C" hardness of 58, the inserts of compositions A and D did not chip. After 26.2 minutes, the flank wear on the inserts of composition A was found to be 0.0045 inch while the wear on those of composition D was found to be 0.0056 inch.

EXAMPLE 7

To evaluate the ability of the inserts to withstand less severe (and thus less economical) cuts on hard steel, the procedure of Example 6 was repeated except that the speed was reduced to 200 sfm and the feed was reduced to 0.0037 inch per revolution in order to accommodate the weaker compositions and thus make measurements possible. Test inserts of compositions A, B and D were tested and the flank wear of each measured after 35 minutes of turning. The results are reported in Table V.

TABLE V
Quenched and Tempered Steel Turning Test Results

| Composition | Flank Wear, inches |
|---|---|
| A | = 0.0036 |
| B | = 0.0063* |
| D | = 0.0044 |

*test insert chipped during test

It is apparent from the data set forth in Table III that the test insert of composition B was at best, not as desirable for this type of cutting because of problems of chipping and relatively lower wear resistance. While the test insert of composition A exhibited slightly higher wear resistance than that of composition B, both compositions are judged to be commercially acceptable.

EXAMPLE 8

To evaluate the ability of the tungsten carbide containing ceramics of the present invention to withstand relatively severe cuts on quenched and tempered steels, the procedure of Example 6 was repeated using type A6 steel having a Rockwell "C" hardness of 58. Inserts of compositions B and M were tested and the flank wear examined after 7.0 and 13.8 minutes. The results are summarized in Table VI.

TABLE VI
Quenched and Tempered Steel Turning Test Results

| Composition | Flank Wear, inches after 7.0 minutes | 13.8 minutes |
|---|---|---|
| B | 0.0049 wear + 0.0065 chip | chipped out |
| M | 0.0044 wear | 0.006 wear + 0.008 chip |

The results demonstrate that inserts of composition M are useable for this type of cut but the inserts of composition B are much less suitable even on this somewhat milder steel.

EXAMPLE 9

To evaluate wear resistance on grey iron, inserts having the compositions A, D, E, and L were tested in turning Class 40 grey iron at a depth of cut of 0.050 inch, a feed rate of 0.0125 inch per revolution and a lead angle of 15°. As the bar was turned down, its machinability increased so the cutting speed was also increased from 1050 sfm at 7 inches diameter to 1250 sfm at 3.9 inches. The inserts were rotated so that each was exposed to iron of the same average machinability at the same average speed. The flank wear was measured after 15.2 minutes and the results are reported in Table VII.

TABLE VII
Grey Iron Turning Test Results

| Composition | Flank Wear, inches |
|---|---|
| A | 0.006–0.007 |
| D | = 0.0042 |
| E | = 0.0064 |
| L | = 0.0053 |

It is apparent from the data as set forth in Table IV that test inserts of compositions D and L had high wear resistance while tests inserts of composition E were of substantially equivalent wear resistance to test inserts of composition A. All of the inserts tested are judged to be commercially suitable for this type of cutting operation.

EXAMPLE 10

To evaluate the wear resistance of a cold pressed and sintered insert of the present invention, in cutting a medium hardness steel, inserts having compositions A, B and Q were tested in turning a 6 inch diameter bar of type 4140 steel which had been quenched and tempered to a Brinell hardness of between 277 and 293. The cutting speed used was 750 surface feet per minute, the depth of cut was 0.0625 in., the lead angle was 15°, and the feed was 0.0125 in. per revolution. After 14 minutes, the flank wear was measured and the results are reported in Table VIII.

TABLE VIII

| Composition | Flank Wear, inches |
|---|---|
| A | 0.0122 |
| B | 0.0105 |
| Q | 0.0100 |

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A high toughness ceramic composition consisting essentially of a dense, homogeneous sintered body consisting essentially of, on a volume percent basis, about 4 to about 20% zirconia, about 60 to about 90% alumina, and about 3 to about 30% of a refractory metal compound selected from the group consisting of: the carbides, nitrides and carbo-nitrides of the Group IVB and VB metals of the periodic table; the carbides of the Group VIB metals of the periodic table; and mixtures of any of the foregoing refractory metal compounds, said composition further characterized in containing less than 1% total of the iron group metals and mixtures thereof.

2. The composition as defined in claim 1 containing about 5 to about 14% zirconia.

3. The composition as defined in claim 1 containing about 8 to about 12% zirconia.

4. The composition as defined in claim 1 in which said refractory metal compound is present in an amount of about 4 to about 20%.

5. The composition as defined in claim 1 in which said refractory metal compound is present in an amount of about 5 to about 15%.

6. The composition as defined in claim 1 in which said refractory metal compound is present in an amount of about 6 to about 10%.

7. The composition as defined in claim 1 in which said iron group metals are present in an amount less than about 0.5%.

8. The composition as defined in claim 1 in which said iron group metals are present in an amount less than about 0.25%.

9. The composition as defined in claim 1 in which said refractory metal compound is chosen from the group consisting of titanium carbide, titanium nitride, tungsten carbide, a 60:40 mixture of hafnium carbide: niobium carbide and mixtures thereof.

10. The composition as defined in claim 1 containing about 78–86% alumina, about 8–12% zirconia and about 6–10% titanium carbide.

11. A high toughness ceramic cutting tool consisting essentially of a dense, homogeneous body of a composition consisting essentially of, on a volume percent basis, about 4 to about 20% zirconia, about 60 to about 90% alumina, and about 3 to about 30% of a refractory metal compound selected from the group consisting of: the carbides, nitrides and carbonitrides of the Group IVB and VB metals of the periodic table; the carbides of the Group VIB metals of the periodic table; and mixtures of any of the foregoing refractory metal compounds, said composition further characterized in containing less than 1% total of the iron group metals and mixtures thereof.

12. The cutting tool as defined in claim 11 wherein said composition consists essentially of about 5 to about 14% zirconia and from about 86 to 90% alumina.

13. The cutting tool as defined in claim 11 wherein said composition contains about 8 to about 12% zirconia.

14. The cutting tool as defined in claim 11 wherein said refractory metal compound is present in an amount of about 4 to about 20%.

15. The cutting tool as defined in claim 11 wherein said refractory metal compound is present in an amount of about 5 to about 15%.

16. The cutting tool as defined in claim 11 wherein said refractory metal compound is present in an amount of about 6 to about 10%.

17. The cutting tool as defined in claim 11 wherein said iron group metals are present in an amount less than about 0.5%.

18. The cutting tool as defined in claim 11 wherein said iron group metals are present in an amount less than about 0.25%.

19. The cutting tool as defined in claim 11 in which said refractory metal compound is chosen from the group consisting of titanium carbide, titanium nitride, tungsten carbide, a 60:40 mixture of hafnium carbide:niobium carbide and mixtures thereof.

20. The cutting tool as defined in claim 11 consisting essentially of 88–90% alumina and about 8–12% zirconia.

21. The cutting tool as defined in claim 11 consisting essentially of from about 78 to 86% alumina, from about 8 to 12% zirconia and from about 6 to 10% of said refractory metal compound.

22. The cutting tool of claim 21 wherein said refractory metal compound is chosen from the group consisting of titanium carbide, titanium nitride, tungsten carbide and a 60:40 mixture of hafnium carbide:niobium carbide and mixtures of the foregoing.

23. The cutting tool as defined in claim 11 consisting essentially of from about 4 to about 20% zirconia and from about 80% to 90% alumina.

* * * * *